Aug. 14, 1951
L. W. MELCHER
2,564,121
POWER SYSTEM
Filed May 11, 1949
3 Sheets-Sheet 1
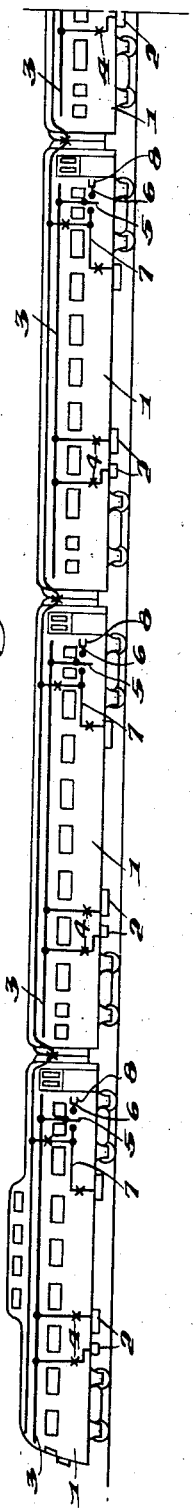
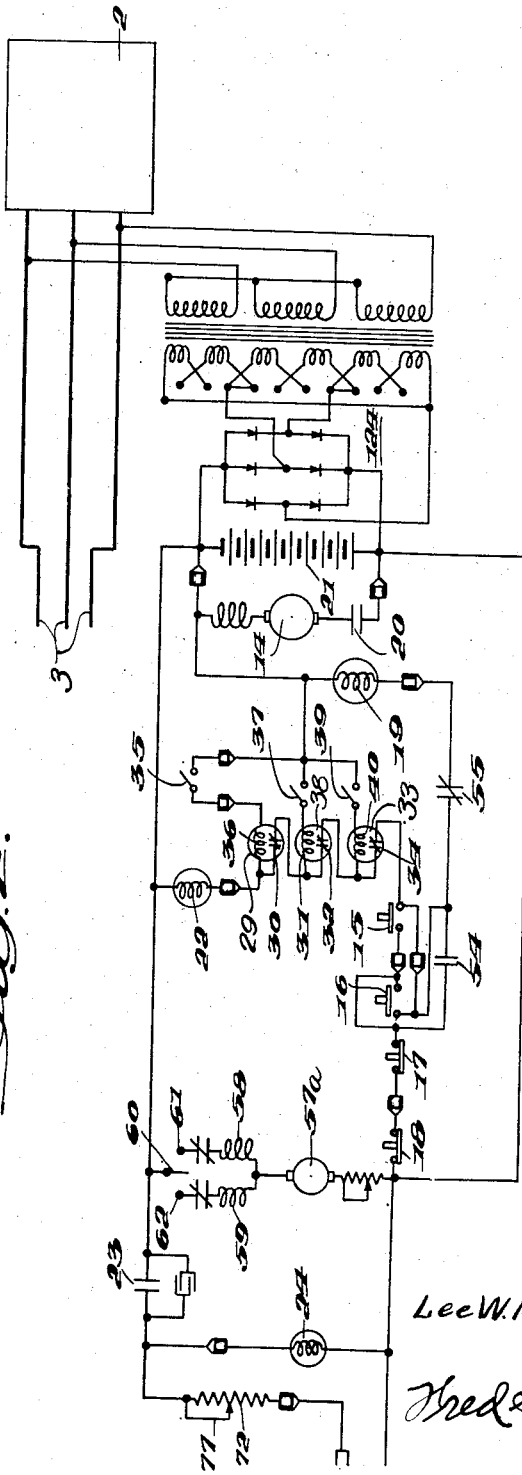
Inventor
Lee W. Melcher.
ATTORNEY Aug. 14, 1951 L. W. MELCHER 2,564,121
POWER SYSTEM
Filed May 11, 1949 3 Sheets-Sheet 2
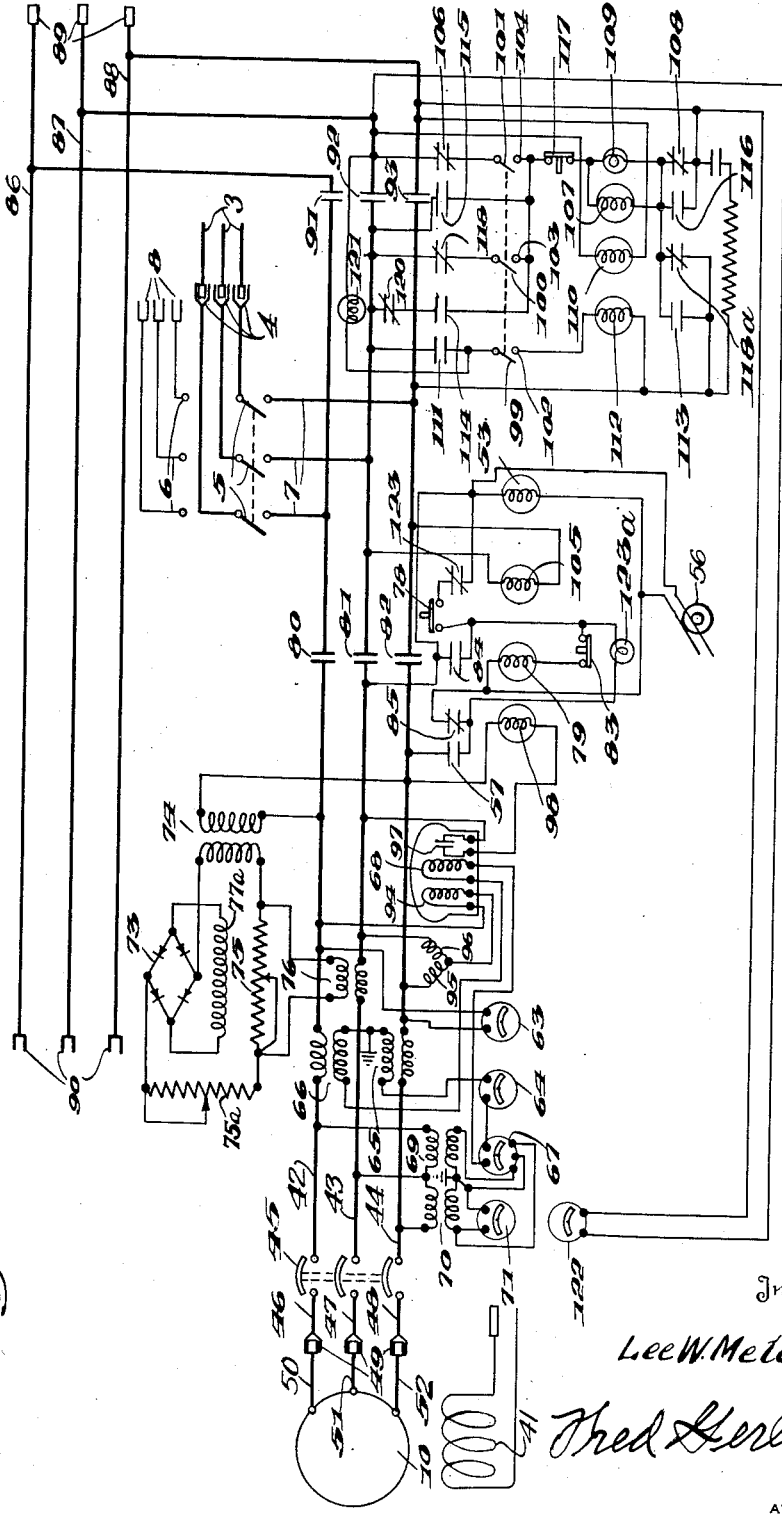
Inventor
Lee W. Melcher
Fred Gerlach
ATTORNEY Aug. 14, 1951

L. W. MELCHER 2,564,121

POWER SYSTEM

Filed May 11, 1949

Inventor
Lee W Melcher.

ATTORNEY

Patented Aug. 14, 1951

2,564,121

UNITED STATES PATENT OFFICE 2,564,121

POWER SYSTEM

Lee W. Melcher, Oconomowoc, Wis., assignor to Waukesha Motor Company, Waukesha, Wis.

Application May 11, 1949, Serial No. 92,597

35 Claims. (Cl. 290—3)

This invention relates to electrical power systems, and particularly to an alternating current electrical system for supplying power to an electric load on railway cars.

Electrical loads on trains, other than for traction equipment, have been supplied with power from an auxiliary head-end source of electrical power usually located in a section of the baggage car or a special power car and independent of the main traction source, storage batteries, and also by individual direct current generators driven by axles of the cars, or by separate prime mover power sources on the individual cars. The use of such direct current generators has been adopted in some instances because direct current does not require synchronism of the individual generators on different cars when an interconnected train line system is used for supplying power to the electrical loads of the different cars.

Alternating current appliances have met with general public favor, and electric service appliances are generally made to operate on alternating current, although in many instances a universal type drive is provided so that the appliance may operate either on alternating or direct current. The use of axle driven generators and the connection of car electric loads to auxiliary head-end generators requires that the main source of power for a train be of such capacity as to be able to supply all of the traction power, and, in addition, supply all of the individual car electric loads. In most instances this requires a provision of an excessively large main generator and prime mover, as during certain periods of the day the car electrical loads may be very small, and during other times of the day the peak car electrical loads may reach a very appreciable percentage of the total power required of the main generator. This results in the operation of the generator and its prime mover at less than substantially full load, and, therefore, less than maximum efficiency for a large part of their operating time. When axle-driven generators are used, the power consumed to drive the axle-driven generators must also be supplied initially by the main source of tractive power, such as the main generator and prime mover in the locomotive of the train. Such systems are, therefore, subject to the same objections as those supplied by the auxiliary head-end generators. Furthermore, as the number of cars in a train is varied on different runs and on different sections of a railway route, the amount of car electrical load may vary considerably with the number of cars in a train. This is particularly so where service cars, such as diners, are provided over a section of a route. A much more efficient utilization of the engine and tractive equipment is obtainable when individual electrical power units are provided for supplying the power to each car of a train. These individual power units may be made of such capacity as to supply the maximum electrical load of the car on which the unit is to be mounted. In this manner certain power units may have a higher capacity than other units for use on diners and other similar service cars.

In order to utilize the individual power units as efficiently as possible, it also is desirable that an interconnection of the car electrical load circuits can be made between the various cars of a train, so that under certain weather conditions, when air conditioning and heating equipment is not needed on the cars or is only required for very short intervals and during the off peak load periods, some of the individual power units may be disconnected from the car electrical load circuits, and the electrical load for all interconnected cars supplied by only certain power units. This provides for the operation of the individual power units at substantially maximum efficiency, for most prime movers and generators are designed to operate most efficiently at substantially full load. Furthermore, if one of the individual power units becomes inoperative for any reason, it may be disconnected and the electrical load of the car with the disconnected power unit may be supplied by a power unit from another car of the train. In addition, individually powered cars have the advantage of having a source of power available even when entirely disconnected from other cars.

An object of my invention is to provide an improved alternating current electrical system particularly adaptable for use on a railway car.

Another object of my invention is to provide an improved electrical system for a railway car adapted to be electrically interconnected to other cars of a train having a plurality of cars.

A further object of my invention is to provide an improved power system for supplying electrical loads on a railway car.

Further objects and advantages of my invention will become apparent, and my invention will be better understood, from the following description, referring to the accompanying drawings, and the features of novelty which characterize my invention will be pointed out with particularity in the claims appended to, and forming part of, this specification.

In carrying out my invention, I provide an electrical system which is adapted to be supplied with electrical energization by an alternator, which may be driven by any suitable prime mover, and provide for the interconnection of a line circuit on each car to a line circuit on other cars of a train, with suitable controls for preventing damage to the system for various reasons. This train line circuit interconnection is facilitated by providing for the driving of each individual alternating current generator or alternator by its prime mover through a slip coupling, preferably of the fluid type. Such a drive greatly simplifies the paralleling of the different sources of alternating current supply by allowing for slippage of the alternator, when it is connected to an energized train line circuit, in order to bring the alternator into synchronism with the energization of the train line circuit without undue shock to the alternator or its prime mover. Another important feature of my improved alternating current power system is the provision of a governor, for controlling the speed of the prime mover, which is responsive to the frequency of the alternator rather than directly responsive to the prime mover speed. This arrangement compensates for slippage which may occur in the coupling between the prime mover and the alternator, and is adapted to maintain the frequency of the alternator at substantially any desired value within very narrow limits.

In the drawings:

Fig. 1 schematically illustrates a train having a plurality of cars provided with electrical systems embodying my invention;

Fig. 2 is a schematic diagram of a part of an electrical system provided with an embodiment of my invention;

Fig. 3 is a schematic diagram of a complementary part of the electrical system shown in Fig. 2.

Figure 4:
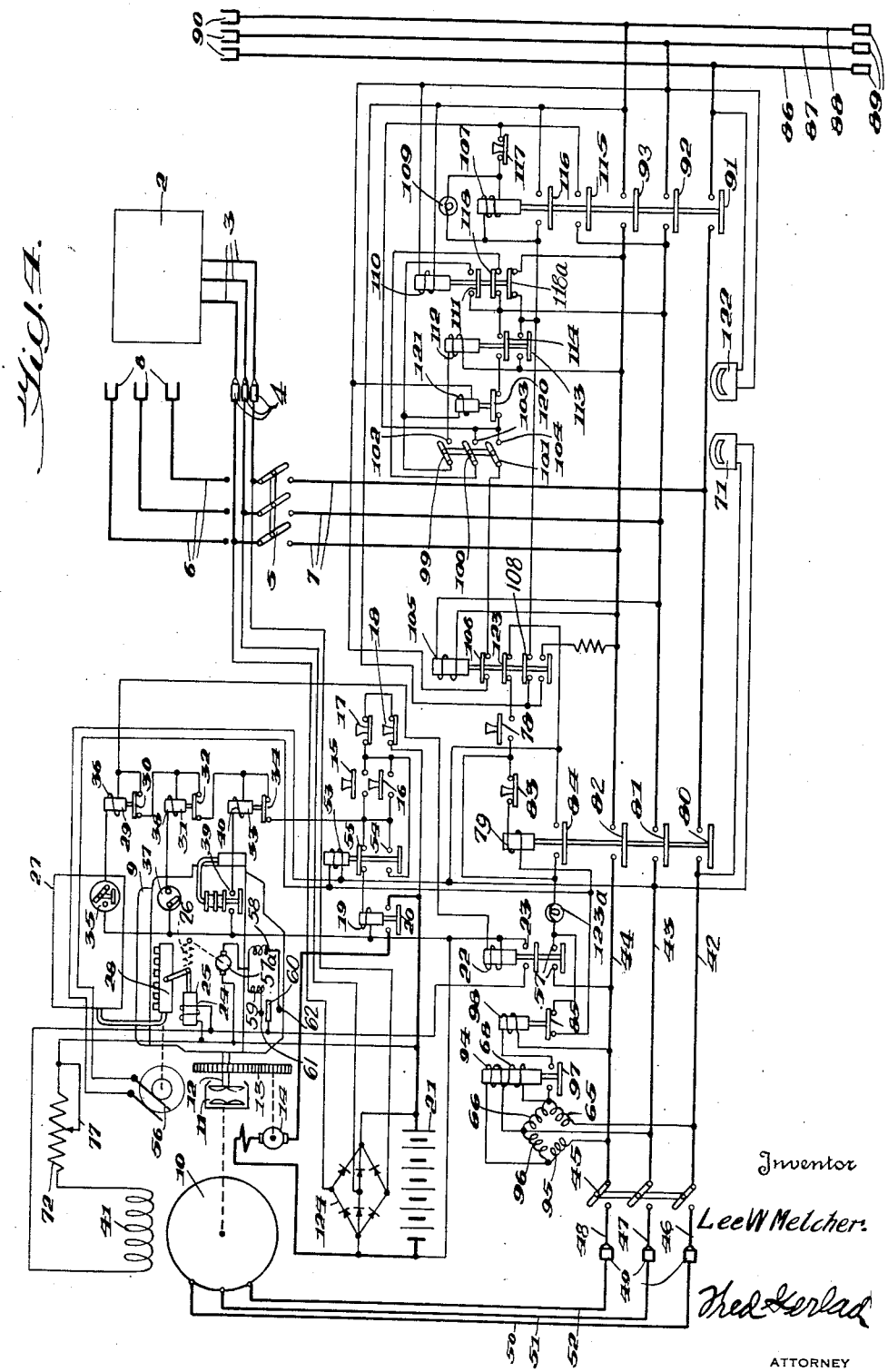
Fig. 4 is a composite simplified schematic diagram of an electrical system, such as that shown in Figs. 2 and 3.

Referring to the drawings, I have shown an embodiment of my improved electrical power system applied to a train having a plurality of cars 1. Each of the cars is provided with a self-contained alternating current electrical system. Each car system is adapted to be electrically connected to the electrical system of an adjacent car for the transfer of power between different cars of the train under certain conditions under which this may be found desirable. Each electrical system of each car includes various electrical loads 2, such as an air conditioning condensing unit, an evaporation cooler, electric lighting loads, water coolers, and other conventional or desired equipment and service outlets. These electrical loads 2 are adapted to be connected to a car electric distribution load circuit 3 by any suitable electrical connection, such as a switch or plug and socket connector 4. Power is adapted to be supplied to the electrical distribution load circuit 3 through a two-way switch 5, which may be selectively closed upon a stand-by service circuit 6 and a car electric line circuit 7. During normal operating conditions the self-contained electrical power system for each car will not require power to be supplied to the system by any outside source of energization, as the operation of the system may be continued even when each car is entirely disconnected from a complete train or from other cars. Under emergency conditions, such as might result from low fuel supply for the prime mover of the system or from other reasons which produce shut-down of the self-contained power system, it is desirable that electrical energization be provided to the car distribution load circuit by an outside source. In such cases, the two-way switch 5 is adapted to connect the distribution load circuit 3 to the stand-by circuit 6 which may be connected to an outside source through any suitable connector, such as a plug and socket connector 8.

Each self-contained power system for each car includes a prime mover source of power of any suitable type, such as an internal combustion engine 9 of the Diesel type, which is adapted to drive an alternating current generator or alternator 10, preferably of the three-phase type. The control of the power system may be subdivided into three general sets of controls, each of which is, nevertheless, interrelated to, interconnected to, and dependent to some extent upon each other for the successful operation of the system. One set of controls is primarily for the purpose of controlling or governing the operation of the prime mover. The second set of controls is primarily for the control of the connection of the alternator of each power system to its respective car circuit, and the third set of controls is primarily for the purpose of connecting each car circuit to a train line circuit for interconnecting electrical systems of adjacent cars of a train.

In an alternating current system, the frequency of the electrical system generally is adapted to be maintained at some predetermined value which requires that the rotatable member of the alternator operates at a substantially constant predetermined speed. Furthermore, the interconnection of different alternators in parallel to supply power to electrical loads, requires that all the alternators supply power at the same frequency and that all of the alternators be in phase. In order to obtain these electrical characteristics, the speed of each prime mover 9 is adapted to be independently controlled in response to the frequency of the alternator 10 which it drives. In addition, the alternator 10 is adapted to be driven by the prime mover 9 through a slip coupling of any suitable type, such as a fluid coupling 11, to allow for slippage between the rotatable member of the alternator 10 and the drive shaft 12 of the prime mover 9, if such slippage is required when connecting the alternator to the train line circuit in order that the alternator may assume its proper phase relationship to the phase of alternating current energization of the train line circuit when the latter is energized by another source of alternating current.

The prime mover controls include equipment for starting and stopping the prime mover, regulating its speed and output, and protecting it against injurious operating conditions while it is running. Where the prime mover 9 is of the internal combustion type, as shown in the drawings, it is adapted to be started by cranking through a suitable gearing 13 which is adapted to be driven by a starting motor 14. In order to energize the starting motor 14 to crank the prime mover 9, a dual set of starting switches 15 and 16 is provided. One of these switches 15 is adapted to be located on a control panel in a compartment within the railway car, and the other starting switch 16 is adapted to be located on a control panel in the unit in which the engine alternator is mounted, which is preferably in the form of a readily demountable cabinet supported in a readily available location under the car superstructure. In this manner the engine-alternator unit may be started from either the inside of the car or independently of the internal car controls. Near the starting switches 15 and 16 are arranged stop switches 17 and 18 for stopping the prime mover 9. In order to start the prime mover 9, one of the starting switches 15 or 16 is depressed to its closed circuit position, which energizes an operating winding 19 of a relay so as to move the relay contactor 20 to closed circuit position. This closed circuit provides for energization of the starting motor 14 by any suitable source of electrical power supply, such as an electric storage battery 21. Closure of one of the starting switches 15 or 16 also closes the circuit for energization of an operating winding 22 of a relay having contacts 23 connected in series with the battery 21, and in series with an operating winding 24 of a fuel pump rack solenoid actuator 25 which is biased by a spring 26 to a position for closing off a supply of fuel from a fuel tank 27 to the prime mover 9 through a governing mechanism 28. Energization of the operating winding 24 of the rack actuator 25 opens the fuel supply to the prime mover to allow its operation.

Under certain conditions it is desirable that the fuel supply to the prime mover should be shut off, and this may be accomplished automatically through the fuel rack actuator 25 by deenergization of its operating winding 24. In order to obtain this automatic stopping of the prime mover by deenergization of the fuel supply solenoid operating winding 24, its energizing circuit is connected across the battery 21 through a series of protective devices. These protective devices include a low fuel relay 29 having a contactor 30 in series with the operating winding 24, a prime mover overheat control device including a relay 31 having a contactor 32 in series with the fuel relay contactor 30 and the operating winding 24, and a low oil pressure device including a relay 33 having a contactor 34 in series with the fuel relay contactor 30 and the overheat relay contactor 32 and the operating winding 24.

The low fuel relay 29 is particularly useful where the prime mover 9 is a Diesel engine, for if the fuel supply of a Diesel engine is depleted and the engine stops, the fuel system will become air bound, and the engine cannot be started after refueling without purging air from the system. This is a laborious task and requires considerable time to perform. It is desirable, therefore, that a Diesel engine be stopped before the fuel in the supply tank is completely depleted. This protection is provided in the illustrated embodiment of my invention by the provision of a float switch 35 of any suitable type, which is connected in series with an operating winding 36 of the low fuel protective relay 29 to energize this operating winding 36 by the battery 21. Energization of the low fuel operating winding 36 opens the circuit through the relay contactor 30 and deenergizes the relay operating winding 22, thereby opening the circuit through the relay contacts 23 and deenergizing the fuel solenoid operating winding 24, permitting the spring 26 to close off the supply of fuel to the prime mover 9, thus stopping its operation before the fuel in the supply tank 27 is depleted to a level such that the fuel system might become air bound.

Operation of the prime mover 9 above a predetermined safe operating temperature is prevented by the overheat protective device, including the relay 31, by the provision of a thermostatically controlled switch 37 which is connected in series with an operating winding 38 of the overheat relay 31 for energizing the relay operating winding 38 by connecting it across the battery 21 when the temperature of the prime mover 9 exceeds the predetermined safe operating value. Such energization of the operating winding 38 opens the circuit through the overheat relay contactor 32, thereby deenergizing the relay operating winding 22 which opens a circuit through the relay contacts 23 and deenergizes the fuel solenoid operating winding 24, so as to permit the spring 26 to bias the fuel rack actuator to its shut off position to stop operation of the prime mover 9.

Operation of the prime mover when the oil pressure of its lubrication system falls below a predetermined safe operating value is prevented by an oil pressure switch 39, which is responsive to the pressure in the engine lubricating system and is provided with contacts connected in series with an operating winding 40 of the oil pressure relay 33 for energization of this operating winding 40 by the battery 21 when the oil pressure falls below the predetermined safe operating value. Such energization of the relay operating winding 40 opens the low oil pressure relay contactor 34 to open the energizing circuit of the relay operating winding 22, thus deenergizing this relay and opening the circuit through its contacts 23. Opening of the circuit through the relay contacts 23 deenergizes the fuel solenoid operating winding 24 and permits the spring 26 to bias the fuel rack actuator to its closed position so as to stop operation of the prime mover 9 and prevent possible damage thereto because of lack of oil pressure in its lubricating system.

In order to place an electrical load on the power system it is necessary that the alternator 10 be provided with field excitation such that the alternator will generate the desired power at a predetermined voltage. This voltage is induced in the alternator winding, which, in the illustrated and preferred embodiment, is a three phase winding in the alternator rotatable member, by a stationary field magnetically excited by a stationary field exciting winding 41. Energization of the field exciting winding 41 is obtained by connecting it across the battery 21 through a circuit in parallel with the fuel solenoid operating winding 24, such that it is energized simultaneously with energization of the operating winding 24 when the relay contacts 23 are closed by the closing of one of the starting switches 15 or 16.

The voltage of the generator may be impressed upon a three phase generator line circuit 42, 43, and 44 by closure of a suitable three phase switch 45 which connects the three phase generator line circuit 42, 43, and 44 to a suitable three phase plug-in circuit 46, 47, and 48, adapted to be electrically connected by a suitable disconnecting plug and socket connection 49 to generator leads 50, 51, and 52. When the generator 10 is connected to the three phase generator line circuit 42, 43, and 44 and its field exciting winding 41 is properly energized, such that voltage is generated and impressed upon the generator line circuit, this voltage is impressed across an alternator voltage relay operating winding 53, through normally closed contacts 85 of a reverse-power protective relay and through contacts 57 which are operated to a closed position by the energization of the field relay operating winding 22, so as to energize this winding and close a circuit through a voltage relay contactor 54. Closure of this circuit provides a holding circuit, around the starting switches 15 or 16, for the relay operating winding 22 to provide for maintenance of the energization of the relay winding 22 by the battery 21 after the manual closing pressure is released from the starting switches 15 or 16. This assures maintenance of the energization of the alternator field exciting winding 41 and of the fuel rack actuator operating winding 24 after the engine starting period. Energization of the alternator voltage relay winding 53 also functions to open a circuit through a relay contactor 55 in series with the starting relay operating winding 19. Opening of this circuit deenergizes the starting relay winding 19, thereby opening the circuit of the starting motor 14 through the starting relay contactor 20 and deenergizing the starting motor. Thus, cranking limit protection to prevent damage to the starting motor is provided by this deenergizing circuit, although, in view of the manual starting control provided by the starting switches 15 and 16, such protection is normally not needed because the skill of the operator should forestall damaging the equipment by continued operation of the starting motor under adverse conditions.

The speed and power output of the prime mover 9 is dependent largely upon the quantity of fuel injected into the engine, and this is primarily a function of the operation of the governing mechanism 28. The governing mechanism is preferably driven at a speed responsive to the frequency of the alternator 10 in order to compensate for slippage within the slip coupling 11. In the illustrated embodiment of this invention, the speed of the governor for the governing mechanism 28 is controlled by a synchronous motor 56 which is energized from the alternator line circuit and is connected thereto through contacts 57 which are adapted to be closed when the field relay operating winding 22 is energized by the closing of one of the starting switches 15 and 16 and through the normally closed contacts 85 of a reverse-power protective relay. In this manner, the governor speed is directly responsive to the alternator frequency, and the effect of coupling slip is effectively eliminated on the operation of a system. Any suitable governor may be utilized for controlling the operation of the governing device 28, and, as in conventional governors, its speed-droop characteristic is a function of the stiffness or rate of the governor spring. The speed of the governor, therefore, is a function of the spring adjustment or tension, and the speed may be raised when the tension of the spring is increased and lowered by a decrease in the spring tension.

In order to obtain parallel operation of alternators on different cars of a multiple car train, the governors and their characteristics should be substantially the same for all units. These may be checked by initially adjusting the governor spring so that all units will have the same speed-load operating characteristics when the units are installed on the cars. It may be found that for some reason the governor spring setting may change so that the characteristic of a unit may not be exactly the same as that of other units in a multiple car train, with the result that if the power systems of different cars are interconnected, certain units may not bear their proper share of the electrical load. Under such conditions it is desirable to provide for the readjustment of the governor spring, and this may be obtained by a remote control on the alternator control panel within each car by adjusting the tension on the faulty governor spring by energization of a governor spring adjusting motor 57a. This governor adjusting motor 57a is adapted to be energized by the battery 21, and is provided with two field exciting windings 58 and 59 to provide for its magnetic excitation and operation in opposite directions. Such operation is controllable by a switch 60 which may be closed on a switch contact 61 to adjust the spring pressure for reducing the governor spring tension and causing the engine alternator set to decrease the load which it carries, or the switch 60 may be closed on a contact 62 to increase the governor spring tension so as to cause the engine alternator set to pick up load.

An indication of the operating characteristics and load of each electrical system is desirable, such that an operator may determine if the engine alternator unit is in condition for supplying load to its electrical circuit after it is started and if it is delivering its proper share of the load when operating in parallel with other alternators. Such an indication should be available to an operator within a railway car when the train is in motion, and may readily be provided by arranging suitable instruments, connected to the electrical circuit and arranged on the alternator control panel. Such instruments and connections are schematically illustrated in Fig. 3. These instruments should include a voltmeter 63 which may be connected directly across one of the phases of the alternator line circuit, an ammeter 64 connected through current transformers 65 and 66 in series with two lines of the alternator line circuit. The ammeter also is connected in series with a current coil of a wattmeter 67 and a reverse power relay operating winding 68. The voltage windings of the wattmeter 67 are connected across the alternator line circuit through potential transformers 69 and 70. A frequency meter 71 also may be connected across the potential transformer 70 to indicate the frequency of the alternator. In this manner the current, voltage, power, and frequency of the alternator 10 are directly indicated upon the control panel within the car and indicate to the operator if the equipment is operating normally.

In order to supply electrical loads on each system and to obtain an equal sharing of a common load by different alternators when they are connected in parallel, it is desirable that the voltage, as well as the frequency of the alternator, should be maintained the same for all alternators. To assure such operation, the energization of the alternator field exciting winding 41 is adapted to be regulated by a voltage regulator which may be of any suitable type, such as a carbon pile resistor regulator 72. In Fig. 3, detail circuit connections of a suitable voltage regulator are shown and include an arrangement for automatically regulating the adjustment of the carbon pile regulator resistor 72. This includes a small selenium rectifier unit 73, which is connected across a secondary of a potential transformer 74 connected across a phase of the alternator line circuit. A cross-current compensating resistor 75 is connected in series with the secondary winding of the potential transformer 74 and across a secondary winding of a current transformer 76, connected in the line of the alternator line circuit to which the potential transformer 74 is not connected. A current limiting resistor 75a is connected in series with the rectifier and the secondary circuit of transformers 74 and 76, and the carbon pile resistor 72 for controlling the current of the field exciting winding 41 is adapted to be controlled automatically by a solenoid 77a connected across the output terminals of the rectifier 73. With such an arrangement the voltage regulator is responsive to fluctuations in the alternator voltage, and the regulator causes the carbon pile resistor 72 to adjust the field current to restore the alternator voltage to its normal predetermined value when voltage fluctuations may occur due to load changes or for other reasons. A manual voltage control 77 may also be provided in order to adjust the initial voltage at which the alternator is to operate and to change the voltage range.

The electrical loads 2 may be connected to the self-contained engine-generator power unit by closing the two-way switch 5 to connect the distribution load circuit 3 to the car line circuit 7 and by closing a manually operable push-button switch 78 when the engine-alternator unit is in operation. Closure of the switch 78 will provide for the energization of an alternator circuit breaker contactor operating winding 79 by connection of this winding across a phase of the alternator line circuit when the car line circuit is deenergized and the alternator line circuit is connected and energized by the alternator 10. Under these conditions, an operating coil 105 of a car voltage relay is deenergized so that contacts 108 of the car voltage relay are in closed circuit position. This connects one side of the alternator circuit breaker winding 79 through the switch 78 and the contactor 108 to the alternator line 43. Also under these conditions, the relay winding 22 is energized so as to close its contacts 57, and an operating winding 98 of a reverse-power relay is deenergized so that its contacts 85 are in closed circuit position. This connects the other side of the alternator circuit breaker winding 79 through contacts 57 and 85 to another alternator line 44, thereby providing energization to the circuit breaker winding 79. Energization of the alternator contact winding 79 connects the alternator line circuit 42, 43, and 44 through contacts 80, 81 and 82 to the car line circuit 7. A manually operable disconnecting push-button switch 83 is connected in series with the alternator contactor operating winding 79, so that opening of the switch 83 will deenergize the operating winding 79 and open the circuit through the contacts 80, 81 and 82, thereby disconnecting the alternator line circuit from the car line circuit. Energization of the alternator contactor operating winding 79 also causes the closing of a holding circuit through a contactor 84 around the manually operable connecting switch 78, so that release of this connecting switch 78 after the alternator contactor is closed will maintain the alternator contactor in closed position until its operating coil 79 is deenergized by the opening of manually operable switch 83, the opening of the main alternator disconnecting switch 45, the shutting down of the engine-alternator unit, or the opening of the energizing circuit of the winding 79 through the contacts 85 of a reverse-power protective relay.

As shown in Figure 3, each car electrical system is provided with a train line circuit 86, 87, and 88 which is adapted to be connected to similar train line circuits on adjacent cars through any suitable electrical connector, such as plug connectors 89 and socket connectors 90. In a train of several cars it may be desirable to supply the electrical loads of one or more cars from the engine-alternator units of one or more other cars, and the interconnection of the train line circuits is adapted to provide for such transfer of power between the various cars of a train. The interconnection of the car line circuits of all the cars in a train does not require that any specific car be electrically connected to the electrical systems of the other cars, and independent operation of each car may be maintained even though the train line circuit of each car is interconnected to the train line circuits of other cars in the train by its connection to the train line circuit of an adjacent car. In other words if it is desired to maintain a particular car so far as its operation is concerned such car may be bypassed by energizing the train line only.

The connection of each engine-alternator for supplying a load in addition to its own respective loads is obtained by providing a train line circuit breaker contactor having contacts 91, 92, and 93 which are adapted to open or close the circuits between the car line circuit 7 and the train line circuit 86, 87, and 88. Closure of the circuits through the contacts 91, 92, and 93 of the train line contactor provides for the transfer of power through the train line contactor between the train line circuit and the car line circuit in either direction. Under certain circumstances, such as the operation of an alternator 10 at a voltage below the predetermined operating voltage of the electrical system when its respective car line circuit is connected to other alternators through the train line circuit, power from the train line circuit may be transferred through the alternator contactor to the alternator line circuit 42, 43, and 44 and to the alternator 10, thus driving the alternator 10 as an alternating current motor and absorbing power from the interconnected electrical system instead of supplying power thereto. This would result in a waste of power and inefficient operation. In order to prevent this transfer of power from the train line circuit to an alternator 10, a reverse power protective circuit is provided which includes the contactor 85 of the reverse power relay. This reverse power protective system also includes a relay having operating windings 68 and 94 which are connected across the alternator line circuit in any suitable manner, as, through current transformers 65 and 66 and potential transformers 95 and 96, respectively. Under normal conditions, the relay operating windings 68 and 94 provide no net excitation to the relay, such that the circuit through the relay contactor 97 remains open and a relay operating winding 98 for the reverse power relay remains deenergized. The connection of the relay windings 68 and 94 are such that when power flows from the car line circuit to the alternator 10, these relay operating windings close the circuit of the reverse power relay operating winding 98 through the relay contactor 97, thereby energizing the reverse power relay and opening the circuit through its contactor 85. The opening of this circuit deenergizes the circuit of the alternator contactor operating winding 79, which opens the circuit breaker and breaks the circuit through the contactors 80, 81, and 82.

In order to utilize a power system at its highest efficiency it is generally desirable that it should be operated at substantially full load. During certain times of the day and at certain seasons of the year, the electrical loads on individual cars of a train may be relatively small, and it may be desirable, therefore, to supply the electrical load requirements or two or more cars from fewer engine-alternator sources of power than the number of cars in the train. Furthermore, if one of the engine alternator units becomes disabled for any reason and cannot supply power to its respective car electrical load, it is desirable that such disabled engine-alternator unit should be disconnected from its car line circuit and that its electrical load circuit should be supplied with power from other units through the train line circuit. Thus, the connection of the car line circuit 7 to its respective train line circuit and to its respective alternator may require the interconnection of these circuits under several different conditions.

The connection of the car line circuit to the alternator when the car line circuit is deenergized as has been described provides for the supply of power to the electrical loads of a car irrespective of whether the car is connected to other cars in a train, or if it is entirely disconnected and is operating independently as a self-contained unit in a station or otherwise.

When it is desired to supply the electrical loads 2 from the train line circuit and the car line circuit 7 is not energized from the alternator 10, closure of the train line contacts 91, 92, and 93 can be obtained by closing contactors 99, 100, and 101 of a manually operable, normally open, switch on contacts 102, 103, and 104. Under these conditions an operating coil 105 of a car voltage relay will be deenergized as it is connected across a phase of the deenergized car line circuit. When thus deenergized, a contactor 106 of the car voltage relay closes a circuit connected to one line 87 of the train line circuit through contactor 101 and the contact 104, so as to energize an operating winding 107 of the train line contactor by connecting it through another contactor 108 of the car voltage relay to another line 88 of the train line circuit. An indicator light 109 is connected across the train line contactor operating winding 107 to indicate when this winding is energized. Closing of the train line contactor so as to energize the car line circuit 7 from the train line circuit 86, 87, and 88 will impress a voltage across the oeprating winding 105 of the car voltage relay and open the aforementioned energizing circuit of the train line contactor operating winding 107 through the car voltage relay contactors 106 and 108. Energization of the train line circuit results in the energization of an operating winding 110 of a train line voltage relay, which closes a circuit through a contactor 111 connected to a line of the car line circuit and to the contactor 99 which is closed upon the contact 102, and energizes an operating winding 112 of an anticipator relay. Energization of the operating winding 112 closes a circuit from one line of the car line circuit through a contactor 113 to one side of the train line contactor operating winding 107, and closes the other side of the operating winding 107 through a contactor 114 and a normally closed contactor 120 of a frequency variation responsive relay to another line of the car line circuit. Release of the normally-open connecting switch, having contactors 99, 100, and 101, will open the circuit of the operating winding 112, which would result in the opening of the circuits through the relay contactors 113 and 114. In order to prevent this from deenergizing the train line contactor operating winding, by this opening of circuits through contactors 113 and 114 and contactors 106 and 108, a holding circuit is provided for the train line contactor operating winding 107. This holding circuit is completed through a contactor 115 on the train line contactor which connects one side of the operating winding 107 directly to one line of the car line circuit, and through another contactor 116 on the train line contactor which connects directly to another line of the train line circuit. This holding circuit maintains the energization of the train line contactor operating winding 107 after the train line contactor is closed, so as to connect the train line circuit to the car line circuit. Disconnection of the train line circuit from the car line circuit is obtained by opening a push button switch 117 in series with the train line contactor operating winding 107.

When the car line circuit 7 is energized by its respective alternator 10 and it is desired to supply power from the alternator 10 to the train line circuit, the train line contactor may be closed by closing the contacts 99, 100 and 101 on the contacts 102, 103, and 104. Under these initial conditions before the contacts 99, 100, and 101 are closed, the train voltage relay operating winding 110 is not energized, and the train line contactor 110 is not energized, and the train line contactor operating winding 107 is connected to one line of the energized car line circuit through contactor 118a of the train voltage relay and to another line of the car line circuit through the switch 117, contact 103 and contactor 100 of the closing switch, and contactor 118 of the train voltage relay. This energization of the train line contactor winding 107 closes the train line contactors 115 and 116 and provides a holding circuit for the train line contactor operating winding 107 through the train line contactor 115 to one line 87 of the car line circuit, and through the train line contactor 116 to the line 88 of the train line circuit, so that the train line contactor remains closed when the closing switch contactor 100 is opened by its release.

Under certain circumstances it may be desired to connect the car line circuit to the train line circuit when the train line circuit is energized by a source of energization other than its respective car alternator 10, and when the car line circuit 7 is energized by its respective car alternator 10. Under these conditions both the car voltage relay operating winding 105 and the train voltage relay operating winding 110 are energized. Closure of the switch contactor 99 on contactor 102 connects one side of the relay operating winding 112 through the closed train voltage relay contactor 111 across lines 87 and 88 of the car line circuit, so as to energize this winding and close circuits through the relay contacts 113 and 114. Closure of contactor 113 connects one side of the train line contactor operating winding 107 to one line 88 of the car line circuit, and closure of the contactor 114 connects the other side of the train line contactor operating winding 107 to another line 87 of the car line circuit through a contactor 120 of a frequency variation responsive relay or circuit breaker. The frequency variation relay contactor is adapted to remain closed if the frequency of the car line circuit and the frequency of the train line circuit are substantially the same, or the variation frequency therebetween is not above a predetermined maximum difference in frequency (approximately 2.5 plus or minus cycles). If the variation in frequency between the car line circuit and the train line circuit exceeds the predetermined maximum desirable difference in frequencies, the contactor 120 will open the last mentioned circuit which connects the train line contactor operating winding 107 for energization by the car line circuit. The opening of the contactor 120 is obtained by energization of a relay operating winding 121 which is connected across the same line of the train line circuit and the car line circuit through the closed contactor 111 of the train voltage relay, such that if the frequencies of the car line circuit and the train line circuit are within the predetermined maximum difference, and are substantially the same, the frequency variation relay operating winding 121 will remain substantially deenergized, and its contactor 120 remain in closed circuit position as shown in Fig. 4. When the frequencies of the car line circuit and the train line circuit are not within the predetermined maximum difference, a voltage which will pulsate at a rate equal to the difference between the two frequencies will be impressed across the frequency variation relay operating winding 121 and will open the contactor 120 so as to prevent energization of the train line contactor operating winding 107, thereby preventing connection on the train line circuit to the car line circuit. An indication of the frequency relation of the alternator 10 and the train line circuit may be obtained by comparing the alternator frequency as indicated on the frequency meter 71 to the train line frequency as indicated by a frequency meter 122 connected across a phase of the train line circuit. The operation of the frequency variation relay 120, however, substantially minimizes the human element in the comparison of frequencies of the alternator and the train line circuit for paralleling conection. The car voltage relay is provided with a contactor 123 in series with the closing switch 78 and the alternator contactor operating winding 79, such that if the car line circuit is energized by its connection to train line circuit, the car voltage relay operating winding 105 is energized and the contactor 123 opens the circuit of the alternator contactor operating winding 79, thereby preventing connection of the alternator to the car line circuit under these conditions. An indicating light 123a is connected across the alternator contactor operating winding 79 to indicate when this winding is energized.

In order to minimize maintenance of the battery 21 and to provide for energization of the alternator field exciting winding 41 without undue use of the battery 21, a battery charging rectifier unit 124 is connected across the car distribution load circuit with its direct current terminals connected across the corresponding terminals on the battery 21. The reason for this is the rectifier unit 124 serves to charge the battery 21. The battery, in turn, provides a source of energy for excitation of the alternator which is constant and not affected by the voltage variations of the alternator, thus heavy surge loads when applied do not materialy affect the voltage of the alternator as would be the case if the alternator excitation were provided by an exciter driven directly from the alternator.

This control system requires a minimum of intelligence of the operator and is substantially free from the imposition of abuse on the equipment by faulty manipulation by an operator. In addition, it provides for a supply of power to electrical loads on a railway car under varying conditions of operation, and provides for the utilization of power-generating equipment at its maximum efficiency. The D. C. power from the rectifier supplies current to satisfy four purposes— (1) battery charging, (2) D. C. controls, (3) alternator excitation and (4) emergency D. C. lighting or any other D. C. requirement.

While I have illustrated and described a particular embodiment of my invention, modifications thereof will occur to those skilled in the art, and I intend, in the appended claims, to cover all modifications within the spirit and scope of this invention.

I claim:

1. In an alternating current electrical system for a train having a plurality of cars, each of said cars having a train electric line circuit, a car electric line circuit, a source of electric power including an alternator, means for electrically connecting said alternator to its respective car line circuit, means for electrically connecting said train line circuit to said car line circuit, means for connecting said train line circuit of each car to the train line circuit of an adjacent car, and means for preventing connection of said alternator to its respective car line circuit when said respective car line circuit is energized by another source of electric power.

2. In an alternating current electrical system for a train having a plurality of cars, each of said cars having a train electric line circuit, a car electric line circuit, a source of electric power including an alternator, means for electrically connecting said alternator to its respective car line circuit, means for electrically connecting said train line circuit to said car line circuit, means for connecting said train line circuit of each car to the train line circuit of an adjacent car, means for preventing connection of said alternator to its respective car line circuit when said respective car line circuit is energized by another source of electric power, and means responsive to flow of power from said car line circuit to said alternator for opening the connection of said alternator to said car line circuit.

3. A power system including a prime mover, a source of electric power supply, an alternator, means including a slip coupling for providing a driving connection between said alternator and said prime mover, a field exciting winding for said alternator, manual means for connecting said field exciting winding to said source of electric power supply, means including a circuit breaker having an operating winding and contacts for electrically connecting said field exciting winding to said source of electric power supply, means responsive to the frequency of said alternator for governing the speed of said prime mover, a car electric line circuit, means operable in response to energization by said alternator for electrically connecting said alternator to said car line circuit, and means responsive to energization by said car line circuit for connecting said circuit breaker operating winding to said source of electric power supply.

4. A power system including a prime mover, electrical means for starting said prime mover, a source of electric power supply, an alternator, means for providing a driving connection between said alternator and said prime mover, a field exciting winding for said alternator, means including a circuit breaker having an operating winding and contacts for electrically connecting said field exciting winding to said source of electric power supply, manually operable means for connecting said prime mover electric starting means and said circuit breaker operating winding to said source of electric power supply, means responsive to the frequency of said alternator for governing the speed of said prime mover, a car electric line circuit, means operable in response to energization by said alternator for electrically connecting said alternator to said car line circuit, and means responsive to energization by said car line circuit for disconnecting said prime mover electric starting means from said source of electric power supply and for connecting said circuit breaker operating winding to said source of electric power supply.

5. A power system including a prime mover, an alternator, means including a slip coupling for providing a driving connection between said prime mover and said alternator, a car electric line circuit, a train electric line circuit, means operable in response to energization by said alternator for electrically connecting said alternator to said car line circuit, and means operable in response to energization by said car line circuit for electrically connecting said train line circuit to said car line circuit when said car line circuit is electrically energized.

6. A power system including a prime mover, a source of energization including an alternator, means including a slip coupling for providing a driving connection between said prime mover and said alternator, a train electric line circuit, means for connecting said train line circuit to another source of energization, a car electric line circuit, means for electrically connecting said alternator to said car line circuit, means for electrically connecting said train line circuit to said car line circuit, and circuit breaker means responsive to energization of said car line circuit for preventing connection of said alternator to said car line circuit when said car line circuit is energized by another source of electric power.

7. A power system including a prime mover, an alternator, means including a slip coupling for providing a driving connection between said prime mover and said alternator, a car electric line circuit, a train electric line circuit, means operable in response to energization by said alternator for electrically connecting said alternator to said car line circuit, means operable in response to energization by said car line circuit for electrically connecting said train line circuit to said car line circuit when said car line circuit is electrically energized, a car electric load circuit, a stand-by service circuit, and means for selectively connecting said car load circuit to said car line circuit and to said stand-by service circuit.

8. A power system including a prime mover, an alternator, means including a fluid slip coupling for providing a driving connection between said prime mover and said alternator, a car electric line circuit, a train electric line circuit, means operable in response to energization by said alternator for electrically connecting said alternator to said car line circuit, means operable in response to energization by said car line circuit for electrically connecting said train line circuit to said car line circuit when said car line circuit is electrically energized by said alternator, and means responsive to a difference in frequency above a predetermined maximum difference between said train line circuit and said car line circuit frequencies when said two line circuits are energized and are not electrically connected for preventing energization of said means for connecting said train line circuit to said car line circuit.

9. A power system including a prime mover, a source of energization including an alternator, means including a fluid slip coupling for providing a driving connection between said prime mover and said alternator, a train electric line circuit, means for connecting said train line circuit to another source of energization, a car electric line circuit, means for electrically connecting said alternator to said car line circuit, means for electrically connecting said train line circuit to said car line circuit, a car electric load circuit, a stand-by service circuit, means for selectively connecting said car load circuit to said car line circuit and to said stand-by service circuit, and means for preventing connection of said alternator to said car line circuit when said car line circuit is energized by another source of energization.

10. An alternating current electric system for a train including an alternator, a car electric line circuit, a train electric line circuit, means operable in response to energization by said alternator for electrically connecting said alternator to said car line circuit, means for connecting said train line circuit to another source of electrical energization, and means operable in response to energization by said train line circuit for electrically connecting said train line circuit to said car line circuit when said car line circuit is deenergized and said train line circuit is energized.

11. An alternating current electric system for a train including an alternator, a car electric line circuit, a train electric line circuit, means operable in response to energization by said alternator for electrically connecting said alternator to said car line circuit, and means including a circuit breaker having an operating winding connected in a circuit for energization from said car line circuit for electrically connecting said train line circuit to said car line circuit when said car line circuit is electrically energized by said alternator.

12. An alternating current electric system having a source of electric power including an alternator, a car electric line circuit, a train electric line circuit, other means for energizing said train line circuit, means operable in response to energization by said alternator for electrically connecting said alternator to said car line circuit, means including a circuit breaker having an operating winding in a circuit connected for energization from said train line circuit for electrically connecting said train line circuit to said car line circuit when said car line circuit is deenergized and said train line circuit is energized, a car electric load circuit, a stand-by service circuit, and means for selectively connecting said car load circuit to said car line circuit and to said stand-by service circuit.

13. An electric system having a source of electric power including an alternator, a train electric line circuit, means for connecting said train line circuit to another source of power, a car electric line circuit, means for electrically connecting said alternator to said car line circuit, means for electrically connecting said train line circuit to said car line circuit, circuit breaker means responsive to energization of said car line circuit for preventing said connection of said alternator to said car line circuit when said car line circuit is energized by another source of electric power, and means responsive to flow of power from said car line circuit to said alternator for effecting disconnection of said alternator from said car line circuit.

14. A power system including a prime mover, a source of energization including an alternator, means including a fluid coupling for providing a driving connection between said prime mover and said alternator, an alternating current train line circuit, means for connecting said train line circuit to another source of energization, an alternating current car line circuit, means for electrically connecting said alternator to said car line circuit, means for electrically connecting said train line circuit to said car line circuit, and means responsive to a variation in frequency above a predetermined maximum difference in frequencies between said car line circuit and said train line circuit frequencies for preventing connection of said train line circuit and said car line circuit.

15. A power system including a prime mover, a source of electric power supply, an alternator, means for providing a driving connection between said alternator and said prime mover, a field exciting winding for said alternator, means including a circuit breaker having an operating winding and contacts for electrically connecting said field exciting winding to said source of electric power supply, means responsive to the frequency of said alternator for governing the speed of said prime mover, a car electric line circuit, means operable in response to energization by said alternator for electrically connecting said alternator to said car line circuit, and means responsive to predetermined undesirable operating conditions of said prime mover for deenergizing said frequency responsive governing means and said field exciting winding circuit breaker operating winding for stopping said prime mover and for deenergizing said alternator field exciting winding and disconnecting said alternator from said car line circuit.

16. A power system including a prime mover, electric means for starting said prime mover, a source of electric power supply, an alternator, means for providing a driving connection between said alternator and said prime mover, a field exciting winding for said alternator, means including a circuit breaker having an operating winding and contacts for electrically connecting said field exciting winding to said source of electric power supply, manually operable means for connecting said prime mover electric starting means and said circuit breaker operating winding to said source of electric power supply, means responsive to the frequency of and electrically energized by said alternator for governing the speed of said prime mover, a car electric line circuit, means operable in response to energization by said alternator for electrically connecting said alternator to said car line circuit, means responsive to energization by said car line circuit for disconnecting said prime mover electric starting means from said source of electric power supply and for connecting said circuit breaker operating winding to said source of electric power supply, and means responsive to predetermined undesirable operating conditions of said prime mover for deenergizing said frequency responsive governing means and said circuit breaker operating winding for stopping said prime mover and for deenergizing said alternator field exciting winding and disconnecting said alternator from said car line circuit.

17. An alternating current electric system including an alternator, a car electric line circuit, a train electric line circuit, means operable in response to energization by said alternator for electrically connecting said alternator to said car line circuit, means including a circuit breaker having an operating winding in a circuit connected for energization from said train line circuit for electrically connecting said train line circuit to said car line circuit when said car line circuit is deenergized, a car electric load circuit, a stand-by service circuit, means for selectively connecting said car load circuit to said car line circuit and to said stand-by service circuit, and means responsive to a variation in frequency above a predetermined maximum difference between said car line circuit and said train line circuit frequencies for preventing connection of said train line circuit to said car line circuit when said car line circuit is connected to said alternator.

18. An electric system including an alternator, a car electric line circuit, a train electric line circuit, means operable in response to energization by said alternator for electrically connecting said alternator to said car line circuit, other means for energizing said train line circuit, and means operable in response to energization by said train line circuit for electrically connecting said train line circuit to said car line circuit when said car line circuit is deenergized and said train line circuit is energized and operable in response to energization by said car line circuit for electrically connecting said train line circuit to said car line circuit when said car line circuit is electrically energized by said alternator.

19. A power system including a prime mover, an alternator, means including a slip coupling for providing a driving connection between said prime mover and said alternator, a car electric line circuit, a train electric line circuit, means operable in response to energization by said alternator for electrically connecting said alternator to said car line circuit, means including a circuit breaker having an operating winding connected in an energizing circuit for energization from said car line circuit for electrically connecting said train line circuit to said car line circuit when said car line circuit is electrically energized by said alternator, and means dependent upon substantial synchronism of said alternator and said train line circuit energization for permitting closing of said energizing circuit of said circuit breaker operating winding.

20. A power system including a prime mover, an alternator, means including a fluid coupling for providing a driving connection between said prime mover and said alternator, a car electric line circuit, a train electric line circuit, means operable in response to energization by said alternator for electrically connecting said alternator to said car line circuit, other means for energizing said train line circuit, means operable in response to energization by said car line circuit for electrically connecting said train line circuit to said car line circuit when said train line circuit is electrically energized by another source of electric power, and means responsive to a variation in frequency above a predetermined maximum difference between said car line circuit and said train line circuit frequencies for preventing energization and closing of said means for connecting said train line circuit and said car line circuit.

21. An electric system including an alternator, a car electric line circuit, a train electric line circuit, other means for energizing said train line circuit, means operable in response to energization by said alternator for electrically connecting said alternator to said car line circuit, means operable in response to energization by said train line circuit for electrically connecting said train line circuit to said car line circuit when said car line circuit is deenergized and said train line circuit is energized and operable in response to energization by said car line circuit for electrically connecting said train line circuit to said car line circuit when said car line circuit is electrically energized by said alternator, and means responsive to a variation in frequency above a predetermined maximum difference in frequencies between said car line circuit and said train line circuit for preventing energization of said means for connecting said train line circuit and said car line circuit when said car line circuit is connected to said alternator.

22. An electric system having a source of energization including an alternator, a train electric line circuit, means for connecting said train line to another source of energization, a car electric line circuit, means for electrically connecting said alterator to said car line circuit, means for electrically connecting said train line circuit to said car line circuit, means responsive to a variation in frequency above a predetermined maximum difference in frequencies between said car line circuit and said train line circuit frequencies for preventing connection of said train line circuit and said car line circuit, means responsive to energization of said car line circuit for preventing connection of said alternator to said car line circuit when said car line circuit is energized by another source of electric power, and means responsive to flow of power from said car line circuit to said alternator for opening said means connecting said alternator to said car line circuit.

23. In an alternating current electrical system for a train having a plurality of cars, a train electric line circuit in each of said cars, a car electric line circuit in each of said cars, a source of electric power including an alternator for each of said cars, means for electrically connecting each of said alternators to its respective car line circuit, means for electrically connecting said train line circuit to said car line circuit on each of said cars, means for connecting said train line circuit of each car to the train line circuit of an adjacent car, a car electric distribution load circuit, means for connecting each respective car distribution load circuit to its respective car line circuit, and means for preventing connection of each of said alternators to its respective car line circuit when said respective car line circuit is energized by another source of electric power.

24. In an alternating current electric system for a train having a plurality of cars, a train electric line circuit in each of said cars, a car electric line circuit in each of said cars, a source of electric power including an alternator on each of said cars, means including a prime mover for driving each of said alternators, means for electrically connecting each of said alternators to its respective car line circuit, means for electrically connecting said train line circuit to said car line circuit on each of said cars, means for connecting said train line circuit of each of said cars to a train line circuit of an adjacent car, a car electric distribution load circuit on each of said cars, a stand-by service circuit for each of said cars, means for selectively connecting each respective car distribution load circuit to each respective car line circuit and its respective stand-by service circuit, and means for preventing connection of each of said alternators to its respective car line circuit when said respective car line circuit is energized by another source of electric power.

25. In an alternating current electrical system for a train having a plurality of cars, a train electric line circuit in each of said cars, a car electric line circuit in each of said cars, a source of electric power including an alternator for each of said cars, means for electrically connecting each of said alternators to its respective car line circuit, means for electrically connecting said train line circuit to said car line circuit on each of said cars, means for connecting said train line circuit of each car to the train line circuit of an adjacent car, a car electric distribution load circuit, means for connecting each respective car distribution load circuit to its respective car line circuit, means for preventing connection of each of said alternators to its respective car line circuit when said respective car line circuit is energized by another source of electric power, and means responsive to flow of power from each respective car line circuit to the alternator on each respective car for opening the connection of said alternator to said respective car line circuit.

26. In an alternating current electric system for a train having a plurality of cars, a train electric line circuit in each of said cars, a car electric line circuit in each of said cars, a source of electric power including an alternator on each of said cars, means including a prime mover for driving each of said alternators, means for electrically connecting each of said alternators to its respective car line circuit, means for electrically connecting said train line circuit to said car line circuit on each of said cars, means for connecting said train line circuit of each of said cars to a train line circuit of an adjacent car, a car electric distribution load circuit on each of said cars, a stand-by service circuit for each of said cars, means for selectively connecting each respective car distribution load circuit to each respective car line circuit and its respective stand-by service circuit, means for preventing connection of each of said alternators to its respective car line circuit when said respective car line circuit is energized by another source of electric power, and means responsive to flow of power from each respective car line circuit to its respective alternator for effecting disconnection of said alternator from said respective car line circuit.

27. A power system including a prime mover, an alternator, means including a fluid slip coupling for providing a driving connection between said prime mover and said alternator, a car electric line circuit, a train electric line circuit, means operable in response to energization by said alternator for electrically connecting said alternator to said car line circuit, means for connecting said train line circuit to another source of energization, means including a circuit breaker having an operating winding connected in an energizing circuit for energization from said train line circuit for electrically connecting said train line circuit to said car line circuit when said car line circuit is deenergized and said train line circuit is energized and for energization from said car line circuit for electrically connecting said train line circuit to said car line circuit when said car line circuit is electrically energized by said alternator, and means dependent upon substantial synchronism of said alternator and said train line circuit energization for permitting closing of said circuit breaker operating winding energizing circuit when said circuit breaker winding is energized by said car line circuit.

28. An electric system having a source of energization including an alternator, a car electric line circuit, a train electric line circuit, means for connecting said train line circuit to another source of energization, means operable in response to energization by said alternator for electrically connecting said alternator to said car line circuit, means including a circuit breaker having an operating winding in a circuit connected for energization by said train line circuit for electrically connecting said train line circuit to said car line circuit when said car line circuit is deenergized and said train line circuit is energized and connected for energization by said car line circuit for electrically connecting said train line circuit to said car line circuit when said car line circuit is electrically energized by said alternator, and means including a second circuit breaker having an operating winding energized in response to a variation in frequency above a predetermined maximum difference in frequencies between said car line circuit and said train line circuit for opening said circuit of said first mentioned circuit breaker operating winding when said car line circuit is connected to said alternator for preventing connection of said car line circuit to said train line circuit.

29. An electric system having a source of electric power including an alternator, a car electric line circuit, a train electric line circuit, means operable in response to energization by said alternator for electrically connecting said alternator to said car line circuit, means operable in response to energization by said car line circuit for electrically connecting said train line circuit to said car line circuit when said car line circuit is electrically energized by said alternator and operable in response to energization by said train line circuit for electrically connecting said train line circuit to said car line circuit when said car line circuit is deenergized and said train line circuit is energized from another source of power, means responsive to a difference in frequency above a predetermined maximum difference between said train line circuit and said car line circuit frequencies when said car line circuit is energized and said two line circuits are not electrically connected for deenergizing said means for connecting said train line circuit to said car line circuit for preventing connection of said latter two circuits, and means including a circuit breaker having an operating winding energized from said car line circuit and being connected for preventing energization of said means connecting said alternator to said car line circuit when said car line circuit is energized.

30. An alternating current electric system for a train having a plurality of cars, each of said cars having a source of electric power including an alternator, a car electric line circuit, a train electric line circuit, means for connecting said train line circuit of each car to the train line circuit of an adjacent car, means operable in response to energization by said alternator for electrically connecting said alternator to said car line circuit, means operable in response to energization by said car line circuit for electrically connecting said train line circuit to said car line circuit when said car line circuit is electrically energized by said alternator and operable in response to energization by said train line circuit for electrically connecting said train line circuit to said line circuit when said car line circuit is deenergized and said train line circuit is energized from another source of power, means responsive to a difference in frequency above a predetermined maximum difference between said train line circuit and said car line circuit when said car line circuit is energized and said two line circuits are not electrically connected for preventing energization of said means for connecting said train line circuit to said car line circuit and preventing connection of said latter two circuits, means including a circuit breaker having an operating winding energized from said car line circuit and being connected for preventing energization of said means connecting said alternator to said car line circuit when said car line circuit is energized, and means responsive to flow of power from said car line circuit to said alternator for effecting disconnection of said alternator from said car line circuit.

31. A power system including a prime mover, a source of energization including an alternator, means including a fluid coupling for providing a driving connection between said prime mover and said alternator, an alternating current train line circuit, means for connecting said train line circuit to another source of energization, an alternating current car line circuit, means for electrically connecting said alternator to said car line circuit, means for electrically connecting said train line circuit to said car line circuit, means responsive to a variation in frequency above a predetermined maximum difference in frequencies between said car line circuit and said train line circuit frequencies for preventing connection of said train line circuit and said car line circuit, an alternating current car load circuit, an alternating current stand-by service circuit for energization from another source, means for selectively connecting said car load circuit to said car line circuit and to said stand-by service circuit, and means for preventing connection of said alternator to said car line circuit when said car line circuit is energized by another source of energization.

32. A power system including a prime mover, electrical means for starting said prime mover, a source of electric power supply, an alternator, means for providing a driving connection between said alternator and said prime mover, a field exciting winding for said alternator, means including a circuit breaker having an operating winding and contacts for electrically connecting said field exciting winding to said source of electric power supply, manually operable means for connecting said prime mover electric starting means and said circuit breaker operating winding to said source of electric power supply, means responsive to the frequency of said alternator for governing the speed of said prime mover, a car electric line circuit, a train electric line circuit, means operable in response to energization by said alternator for electrically connecting said alternator to said car line circuit, means responsive to energization by said car line circuit for disconnecting said prime mover electric starting means from said source of electric power supply and for connecting said field exciting winding circuit breaker operating winding to said source of electric power supply, and means for electrically connecting said train line circuit to said car line circuit.

33. A power system including a prime mover, a source of electric power supply, a source of alternating current energization including an alternator, means for providing a driving connection between said alternator and said prime mover, a field exciting winding for said alternator, means including a circuit breaker having an operating winding and contacts for electrically connecting said field exciting winding to said source of electric power supply, means responsive to the frequency of said alternator for governing the speed of said prime mover, a car electric line circuit, a train electric line circuit, means for connecting said train line circuit to another source of energization, means operable in response to energization by said alternator for electrically connecting said alternator to said car line circuit, means responsive to energization by said car line circuit for connecting said field exciting winding circuit breaker operating winding to said source of electric power supply, means including a second circuit breaker having an operating winding in an energizing circuit for energization from said car line circuit for electrically connecting said train line circuit to said car line circuit when said car line circuit is electrically energized by said alternator and for energization from said train line circuit for connecting said train line circuit to said car line circuit when said car line circuit is deenergized and said train line circuit is energized from another source of energization, means responsive to a variation in frequency above a predetermined maximum difference in frequencies between said car line circuit and said train line circuit frequencies when said two line circuits are energized by different sources of energization for preventing closing of said energizing circuit of said second circuit breaker operating winding, and means responsive to predetermined undesirable operating conditions of said prime mover for deenergizing said frequency responsive governing means and field exciting winding circuit breaker operating winding for stopping said prime mover and for deenergizing said alternator field exciting winding and disconnecting said alternator from said car line circuit.

34. A power system including a prime mover, electrical means for starting said prime mover, a source of electric power supply, a source of alternating current energization including an alternator, means including a fluid slip coupling for providing a driving connection between said prime mover and said alternator, a field exciting winding for said alternator, means including a circuit breaker having an operating winding and contacts for electrically connecting said field exciting winding to said source of electric power supply, manually operable means for connecting said prime mover electric starting means and said circuit breaker operating winding to said source of electric power supply, a car electric line circuit, a train electric line circuit, means for connecting said train line circuit to another source of energization, means operable in response to energization by said alternator for electrically connecting said alternator to said car line circuit, means responsive to energization by said car line circuit for disconnecting said prime mover electric starting means from said source of electric power supply and for connecting said field exciting winding circuit breaker operating winding to said source of electric power supply, means including a second circuit breaker having an operating winding connected in an energizing circuit for energization from said car line circuit for electrically connecting said train line circuit to said car line circuit when said car line circuit is electrically energized by said alternator, and means dependent upon substantial synchronism of said alternator and said train line circuit energization for closing said energizing circuit of said second circuit breaker operating winding.

35. A power system including a prime mover, electrical means for starting said prime mover, a source of electric power supply, a source of alternating current energization including an alternator, means for providing a driving connection between said alternator and said prime mover, a field exciting winding for said alternator, means including a circuit breaker having an operating winding and contacts for electrically connecting said field exciting winding to said source of electric power supply, manually operable means for connecting said prime mover electric starting means and said circuit breaker operating winding to said source of electric power supply, means responsive to the frequency of and electrically energized by said alternator for governing the speed of said prime mover, a car electric line circuit, a train electric line circuit, means for connecting said train line circuit to another source of energization, means operable in response to energization by said alternator for electrically connecting said alternator to said car line circuit, means responsivce to energization by said car line circuit for disconnecting said prime mover electric starting means from said source of electric power supply and for connecting said field exciting winding circuit breaker operating winding to said source of electric power supply, means including a second circuit breaker having an operating winding in an energizing circuit for energization from said car line circuit for electrically connecting said train line circuit to said car line circuit when said car line circuit is electrically energized by said alternator and for energization from said train line circuit for electrically connecting said train line circuit to said car line circuit when said car line circuit is deenergized and said train line circuit is energized by another source of energization, means dependent upon substantial synchronism of said alternator and said train line circuit energization when said train line circuit is energized by another source of energization for closing said energizing circuit of said second circuit breaker operating winding, and means responsive to predetermined operating conditions of said prime mover for deenergizing said frequency responsive governing means and said field exciting winding circuit breaker operating winding for stopping said prime mover and for deenergizing said alternator field exciting winding and disconnecting said alternator from said car line circuit.

LEE W. MELCHER.

REFERENCES CITED

The following references are of record in the file of this patent:

UNITED STATES PATENTS

| Number | Name | Date |
|---|---|---|
| Re. 22,168 | Hamilton | Sept. 1, 1942 |
| 264,666 | Edison | Sept. 19, 1882 |
| 1,505,853 | Brainard | Aug. 19, 1924 |
| 1,655,469 | MacMillan | Jan. 10, 1928 |
| 1,662,366 | Cosgray | Mar. 13, 1928 |
| 1,839,921 | Herr | Jan. 5, 1932 |
| 1,866,494 | Strong | July 5, 1932 |
| 2,006,524 | Strong | July 2, 1935 |
| 2,189,353 | Steinbaur et al. | Feb. 6, 1940 |
| 2,261,701 | Steinbaur et al. | Nov. 4, 1941 |
| 2,392,469 | Exner | Jan. 8, 1946 |
| 2,451,976 | Reagan et al. | Oct. 19, 1948 |
| 2,455,070 | Lawrence | Nov. 30, 1948 |
| 2,459,631 | Eames | Jan. 18, 1949 |